United States Patent
Kamath et al.

(10) Patent No.: US 8,856,801 B2
(45) Date of Patent: Oct. 7, 2014

(54) TECHNIQUES FOR EXECUTING NORMALLY INTERRUPTIBLE THREADS IN A NON-PREEMPTIVE MANNER

(75) Inventors: Dayavanti G. Kamath, Santa Clara, CA (US); Nirapada Ghosh, Sunnyvale, CA (US); Dar-ren Leu, Santa Clara, CA (US); Nilanjan Mukherjee, Santa Clara, CA (US); Vijoy Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 13/602,365

(22) Filed: Sep. 4, 2012

(65) Prior Publication Data

US 2012/0324460 A1    Dec. 20, 2012

Related U.S. Application Data

(63) Continuation of application No. 13/107,896, filed on May 14, 2011, now abandoned.

(51) Int. Cl.
| | |
|---|---|
| G06F 9/46 | (2006.01) |
| G06F 9/48 | (2006.01) |
| G06F 9/52 | (2006.01) |

(52) U.S. Cl.
CPC ............... *G06F 9/52* (2013.01); *G06F 9/4881* (2013.01); *G06F 2209/486* (2013.01)
USPC ........... 718/107; 718/100; 718/101; 718/106; 718/108

(58) Field of Classification Search
None
See application file for complete search history.

(56) References Cited

U.S. PATENT DOCUMENTS

| | | | |
|---|---|---|---|
| 5,394,402 A | 2/1995 | Ross | |
| 5,515,359 A | 5/1996 | Zheng | |
| 5,617,421 A | 4/1997 | Chin et al. | |

(Continued)

FOREIGN PATENT DOCUMENTS

| | | |
|---|---|---|
| CN | 1897567 | 1/2007 |
| CN | 101030959 A | 9/2007 |
| CN | 101087238 | 12/2007 |
| EP | 0853405 | 7/1998 |

OTHER PUBLICATIONS

U.S. Appl. No. 13/107,894, Non-Final Office Action Dated Jun. 20, 2013.

(Continued)

*Primary Examiner* — Adam Lee
(74) *Attorney, Agent, or Firm* — Yudell Isidore Ng Russell PLLC; Matthew Baca

(57) ABSTRACT

A technique for executing normally interruptible threads of a process in a non-preemptive manner includes in response to a first entry associated with a first message for a first thread reaching a head of a run queue, receiving, by the first thread, a first wake-up signal. In response to receiving the wake-up signal, the first thread waits for a global lock. In response to the first thread receiving the global lock, the first thread retrieves the first message from an associated message queue and processes the retrieved first message. In response to completing the processing of the first message, the first thread transmits a second wake-up signal to a second thread whose associated entry is next in the run queue. Finally, following the transmitting of the second wake-up signal the first thread releases the global lock.

8 Claims, 7 Drawing Sheets

(56) References Cited

U.S. PATENT DOCUMENTS

| | | |
|---|---|---|
| 5,633,859 A | 5/1997 | Jain et al. |
| 5,633,861 A | 5/1997 | Hanson et al. |
| 5,742,604 A | 4/1998 | Edsall et al. |
| 5,832,484 A * | 11/1998 | Sankaran et al. ............ 1/1 |
| 5,893,320 A | 4/1999 | Demaree |
| 6,147,970 A | 11/2000 | Troxel |
| 6,304,901 B1 | 10/2001 | McCloghrie et al. |
| 6,347,337 B1 | 2/2002 | Shah et al. |
| 6,567,403 B1 | 5/2003 | Congdon et al. |
| 6,646,985 B1 | 11/2003 | Park et al. |
| 6,839,768 B2 | 1/2005 | Ma et al. |
| 6,901,452 B1 | 5/2005 | Bertagna |
| 7,035,220 B1 | 4/2006 | Simcoe |
| 7,173,934 B2 | 2/2007 | Lapuh et al. |
| 7,263,060 B1 | 8/2007 | Garofalo et al. |
| 7,475,397 B1 * | 1/2009 | Garthwaite et al. .......... 718/101 |
| 7,483,370 B1 | 1/2009 | Dayal et al. |
| 7,508,763 B2 | 3/2009 | Lee |
| 7,561,517 B2 | 7/2009 | Klinker et al. |
| 7,593,320 B1 | 9/2009 | Cohen et al. |
| 7,668,966 B2 | 2/2010 | Klinker et al. |
| 7,830,793 B2 | 11/2010 | Gai et al. |
| 7,839,777 B2 | 11/2010 | DeCusatis et al. |
| 7,848,226 B2 | 12/2010 | Morita |
| 7,912,003 B2 | 3/2011 | Radunovic et al. |
| 7,974,223 B2 | 7/2011 | Zelig et al. |
| 8,085,657 B2 | 12/2011 | Legg |
| 8,139,358 B2 | 3/2012 | Tambe |
| 8,194,534 B2 | 6/2012 | Pandey et al. |
| 8,204,061 B1 | 6/2012 | Sane et al. |
| 8,213,429 B2 | 7/2012 | Wray et al. |
| 8,265,075 B2 | 9/2012 | Pandey |
| 8,271,680 B2 | 9/2012 | Salkewicz |
| 8,325,598 B2 | 12/2012 | Krzanowski |
| 8,345,697 B2 | 1/2013 | Kotha et al. |
| 8,406,128 B1 | 3/2013 | Brar et al. |
| 8,498,284 B2 | 7/2013 | Pani et al. |
| 8,498,299 B2 | 7/2013 | Katz et al. |
| 8,625,427 B1 | 1/2014 | Terry et al. |
| 2002/0191628 A1 | 12/2002 | Liu et al. |
| 2003/0185206 A1 | 10/2003 | Jayakrishnan |
| 2004/0031030 A1 | 2/2004 | Kidder et al. |
| 2004/0088451 A1 | 5/2004 | Han |
| 2004/0243663 A1 | 12/2004 | Johanson et al. |
| 2004/0255288 A1 | 12/2004 | Hashimoto et al. |
| 2005/0047334 A1 | 3/2005 | Paul et al. |
| 2005/0080963 A1 | 4/2005 | Schopp |
| 2006/0029072 A1 | 2/2006 | Perera et al. |
| 2006/0251067 A1 | 11/2006 | DeSanti et al. |
| 2007/0036178 A1 | 2/2007 | Hares et al. |
| 2007/0157200 A1 | 7/2007 | Hopkins |
| 2007/0263640 A1 | 11/2007 | Finn |
| 2008/0205377 A1 | 8/2008 | Chao et al. |
| 2008/0216080 A1 * | 9/2008 | Cavage et al. ............ 718/102 |
| 2008/0225712 A1 | 9/2008 | Lange |
| 2008/0228897 A1 | 9/2008 | Ko |
| 2009/0037927 A1 | 2/2009 | Sangili et al. |
| 2009/0125882 A1 * | 5/2009 | Frigo et al. ............ 717/116 |
| 2009/0129385 A1 | 5/2009 | Wray et al. |
| 2009/0185571 A1 | 7/2009 | Tallet |
| 2009/0213869 A1 | 8/2009 | Rajendran et al. |
| 2009/0252038 A1 | 10/2009 | Cafiero et al. |
| 2009/0271789 A1 * | 10/2009 | Babich ............ 718/100 |
| 2010/0054129 A1 | 3/2010 | Kuik et al. |
| 2010/0054260 A1 | 3/2010 | Pandey et al. |
| 2010/0097926 A1 | 4/2010 | Huang et al. |
| 2010/0158024 A1 | 6/2010 | Sajassi et al. |
| 2010/0183011 A1 | 7/2010 | Chao |
| 2010/0223397 A1 | 9/2010 | Elzur |
| 2010/0226368 A1 | 9/2010 | Mack-Crane et al. |
| 2010/0242043 A1 | 9/2010 | Shorb |
| 2010/0246388 A1 | 9/2010 | Gupta et al. |
| 2010/0257263 A1 | 10/2010 | Casado et al. |
| 2010/0265824 A1 | 10/2010 | Chao et al. |
| 2010/0303075 A1 | 12/2010 | Tripathi et al. |
| 2011/0007746 A1 | 1/2011 | Mudigonda et al. |
| 2011/0019678 A1 | 1/2011 | Mehta et al. |
| 2011/0026403 A1 | 2/2011 | Shao et al. |
| 2011/0026527 A1 | 2/2011 | Shao et al. |
| 2011/0032944 A1 | 2/2011 | Elzur et al. |
| 2011/0035494 A1 | 2/2011 | Pandey et al. |
| 2011/0103389 A1 | 5/2011 | Kidambi et al. |
| 2011/0134793 A1 | 6/2011 | Elsen et al. |
| 2011/0235523 A1 | 9/2011 | Jha et al. |
| 2011/0280572 A1 | 11/2011 | Vobbilisetty et al. |
| 2011/0299406 A1 | 12/2011 | Vobbilisetty et al. |
| 2011/0299409 A1 | 12/2011 | Vobbilisetty et al. |
| 2011/0299532 A1 | 12/2011 | Yu et al. |
| 2011/0299533 A1 | 12/2011 | Yu et al. |
| 2011/0299536 A1 | 12/2011 | Cheng et al. |
| 2012/0014261 A1 | 1/2012 | Salam et al. |
| 2012/0014387 A1 | 1/2012 | Dunbar et al. |
| 2012/0027017 A1 | 2/2012 | Rai et al. |
| 2012/0033541 A1 | 2/2012 | Jacob Da Silva et al. |
| 2012/0117228 A1 | 5/2012 | Gabriel et al. |
| 2012/0131662 A1 | 5/2012 | Kuik et al. |
| 2012/0163164 A1 | 6/2012 | Terry et al. |
| 2012/0177045 A1 | 7/2012 | Berman |
| 2012/0226866 A1 | 9/2012 | Bozek et al. |
| 2012/0228780 A1 | 9/2012 | Kim et al. |
| 2012/0243539 A1 | 9/2012 | Keesara |
| 2012/0243544 A1 | 9/2012 | Keesara |
| 2012/0287786 A1 | 11/2012 | Kamble et al. |
| 2012/0287787 A1 | 11/2012 | Kamble et al. |
| 2012/0287939 A1 | 11/2012 | Leu et al. |
| 2012/0320749 A1 | 12/2012 | Kamble et al. |
| 2013/0022050 A1 | 1/2013 | Leu et al. |
| 2013/0051235 A1 | 2/2013 | Song et al. |
| 2013/0064067 A1 | 3/2013 | Kamath et al. |
| 2013/0064068 A1 | 3/2013 | Kamath et al. |

OTHER PUBLICATIONS

U.S. Appl. No. 13/595,970, Final Office Action Dated Sep. 25, 2013.
U.S. Appl. No. 13/594,970, Non-Final Office Action Dated May 29, 2013.
U.S. Appl. No. 13/107,397, Final Office Action Dated May 29, 2013.
U.S. Appl. No. 13/107,397, Non-Final Office Action Dated Jan. 4, 2013.
U.S. Appl. No. 13/466,754, Non-Final Office Action Dated Sep. 25, 2013.
U.S. Appl. No. 13/229,867, Non-Final Office Action Dated May 24, 2013.
U.S. Appl. No. 13/595,047, Non-Final Office Action Dated May 24, 2013.
U.S. Appl. No. 13/107,985, Notice of Allowance Dated Jul. 18, 2013.
U.S. Appl. No. 13/107,985, Non-Final Office Action Dated Feb. 28, 2013.
U.S. Appl. No. 13/107,433, Final Office Action Date Jul. 10, 2013.
U.S. Appl. No. 13/107,433, Non-Final Office Action Dated Jan. 28, 2013.
U.S. Appl. No. 13/466,790, Final Office Action Dated Jul. 12, 2013.
U.S. Appl. No. 13/466,790, Non-Final Office Action Dated Feb. 15, 2013.
U.S. Appl. No. 13/107,554, Final Office Action Dated Jul. 3, 2013.
U.S. Appl. No. 13/107,554, Non-Final Office Action Dated Jan. 8, 2013.
U.S. Appl. No. 13/229,891, Non-Final Office Action Dated May 9, 2013.
U.S. Appl. No. 13/595,405, Non-Final Office Action Dated May 9, 2013.
U.S. Appl. No. 13/107,896, Notice of Allowance Dated Jul. 29, 2013.
U.S. Appl. No. 13/107,896, Non-Final Office Action Dated Mar. 7, 2013.
U.S. Appl. No. 13/267,459, Non-Final Office Action Dated May 2, 2013.
U.S. Appl. No. 13/267,578, Non-Final Office Action Dated Aug. 6, 2013.
U.S. Appl. No. 13/267,578, Non-Final Office Action Dated Apr. 5, 2013.
U.S. Appl. No. 13/314,455, Final Office Action Dated Aug. 30, 2013.

(56) References Cited

OTHER PUBLICATIONS

U.S. Appl. No. 13/314,455, Non-Final Office Action Dated Apr. 24, 2013.
U.S. Appl. No. 13/107,896, entitled "Techniques for Executing Normally Interruptible Threads in a non-preemptive manner"; Non-final office action dated Mar. 7, 2013 (17 pg).
U.S. Appl. No. 13/107,896, entitled "Techniques for Executing normally interruptible threads in a non-preemptive manner"; Notice of Allowance dated Jul. 29, 2013 (18 pg).
U.S. Appl. No. 13/107,554, Notice of Allowance Dated Oct. 18, 2013.
U.S. Appl. No. 13/267,459, Final Office Action Dated Oct. 23, 2013.
U.S. Appl. No. 13/107,894, Final Office Action Dated Nov. 1, 2013.
U.S. Appl. No. 13/594,993, Non-Final Office Action Dated Oct. 25, 2013.
U.S. Appl. No. 13/595,405, Final Office Action Dated Nov. 19, 2013.
U.S. Appl. No. 13/229,891, Final Office Action Dated Nov. 21, 2013.
U.S. Appl. No. 13/621,219, Non-Final Office Action Dated Nov. 26, 2013.
U.S. Appl. No. 13/594,970, Final Office Action Dated Dec. 4, 2013.
U.S. Appl. No. 13/595,047, Notice of Allowance Dated Dec. 23, 2013.
U.S. Appl. No. 13/229,867, Notice of Allowance Dated Dec. 30, 2013.
U.S. Appl. No. 13/107,894, Notice of Allowance Dated Jan. 10, 2014.
U.S. Appl. No. 13/267,578, Notice of Allowance Dated Jan. 24, 2014.
U.S. Appl. No. 13/107,894, Notice of Allowance Dated Feb. 19, 2014.
U.S. Appl. No. 13/594,993, Notice of Allowance Dated Feb. 19, 2014.
U.S. Appl. No. 13/229,891, Notice of Allowance Dated Feb. 19, 2014.
U.S. Appl. No. 13/655,975, Notice of Allowance Dated Feb. 19, 2014.
U.S. Appl. No. 13/780,530, Non-Final Office Action Dated Feb. 20, 2014.
U.S. Appl. No. 13/315,443, Non-Final Office Action Dated Feb. 20, 2014.
Martin, et al., "Accuracy and Dynamics of Multi-Stage Load Balancing for Multipath Internet Routing", Institute of Computer Science, Univ. of Wurzburg Am Hubland, Germany, IEEE Int'l Conference on Communications (ICC) Glasgow, UK, pp. 1-8, Jun. 2007.
Kinds, et al., "Advanced Network Monitoring Brings Life to the Awareness Plane", IBM Research Spyros Denazis, Univ. of Patras Benoit Claise, Cisco Systems, IEEE Communications Magazine, pp. 1-7, Oct. 2008.
Kandula, et al., "Dynamic Load Balancing Without Packet Reordering", ACM SIGCOMM Computer Communication Review, vol. 37, No. 2, pp. 53-62, Apr. 2007.
Vazhkudai, et al., "Enabling the Co-Allocation of Grid Data Transfers", Department of Computer and Information Sciences, The Univ. of Mississippi, pp. 44-51, Nov. 17, 2003.
Xiao, et al. "Internet QoS: A Big Picture", Michigan State University, IEEE Network, pp. 8-18, Mar./Apr. 1999.
Jo et al., "Internet Traffic Load Balancing using Dynamic Hashing with Flow Volume", Conference Title: Internet Performance and Control of Network Systems III, Boston MA pp. 1-12, Jul. 30, 2002.
Schueler et al., "Tcp-Splitter: A TCP/IP Flow Monitor in Reconfigurable Hardware", Appl. Res. Lab., Washington Univ. pp. 54-59, Feb. 19, 2003.
Yemini et al., "Towards Programmable Networks"; Dept. of Computer Science Columbia University, pp. 1-11, Apr. 15, 1996.
Soule, et al., "Traffic Matrices: Balancing Measurements, Interference and Modeling", vol. 33, Issue: 1, Publisher: ACM, pp. 362-373, Year 2005.
De-Leon, "Flow Control for Gigabit", Digital Equipment Corporation (Digital), IEEE 802.3z Task Force, Jul. 9, 1996.
Schlansker, et al., "High-Performance Ethernet-Based Communications for Future Multi-Core Processors", Proceedings of the 2007 ACM/IEEE conference on Supercomputing, Nov. 10-16, 2007.

Yoshigoe, et al., "Rate Control for Bandwidth Allocated Services in IEEE 802.3 Ethernet", Proceedings of the 26th Annual IEEE Conference on Local Computer Networks, Nov. 14-16, 2001.
Tolmie, "HIPPI-6400—Designing for speed", 12th Annual Int'l Symposium on High Performance Computing Systems and Applications (HPCSt98), May 20-22, 1998.
Manral, et al., "Rbridges: Bidirectional Forwarding Detection (BFD) support for TRILL draft-manral-trill-bfdencaps-01", pp. 1-10, TRILL Working Group Internet-Draft, Mar. 13, 2011.
Perlman, et al., "Rbridges: Base Protocol Specification", pp. 1-117, TRILL Working Group Internet-Draft, Mar. 3, 2010.
D.E. Eastlake, "Rbridges and the IETF TRILL Protocol", pp. 1-39, TRILL Protocol, Dec. 2009.
Leu, Dar-Ren, "dLAG-DMLT over TRILL", BLADE Network Technologies, pp. 1-20, Copyright 2009.
Posted by Mike Fratto, "Cisco's FabricPath and IETF TRILL: Cisco Can't Have Standards Both Ways", Dec. 17, 2010; http://www.networkcomputing.com/data-networking-management/229500205.
Cisco Systems Inc., "Cisco FabricPath Overview", pp. 1-20, Copyright 2009.
Brocade, "BCEFE in a Nutshell First Edition", Global Education Services Rev. 0111, pp. 1-70, Copyright 2011, Brocade Communications Systems, Inc.
Pettit et al., Virtual Switching in an Era of Advanced Edges, pp. 1-7, Nicira Networks, Palo Alto, California. Version date Jul. 2010.
Pfaff et al., Extending Networking into the Virtualization Layer, pp. 1-6, Oct. 2009, Proceedings of the 8th ACM Workshop on Hot Topics in Networks (HotNets-VIII), New York City, New York.
Sherwood et al., FlowVisor: A Network Virtualization Layer, pp. 1-14, Oct. 14, 2009, Deutsche Telekom Inc. R&D Lab, Stanford University, Nicira Networks.
Yan et al., Tesseract: A 4D Network Control Plane, pp. 1-15, NSDI'07 Proceedings of the 4th USENIX conference on Networked systems design & implementation USENIX Association Berkeley, CA, USA 2007.
Hunter et al., BladeCenter, IBM Journal of Research and Development, vol. 49, No. 6, p. 905. Nov. 2005.
VMware, Inc., "VMware Virtual Networking Concepts", pp. 1-12, Latest Revision: Jul 29, 2007.
Perla, "Profiling User Activities on Guest OSes in a Virtual Machine Environment." (2008).
Shi et al., Architectural Support for High Speed Protection of Memory Integrity and Confidentiality in Multiprocessor Systems, pp. 1-12, Proceedings of the 13th International Conference on Parallel Architecture and Compilation Techniques (2004).
Guha et al., ShutUp: End-to-End Containment of Unwanted Traffic, pp. 1-14, (2008).
Recio et al., Automated Ethernet Virtual Bridging, pp. 1-11, IBM 2009.
Sproull et al., "Control and Configuration Software for a Reconfigurable Networking Hardware Platform", Applied Research Laboratory, Washington University, Saint Louis, MO 63130; pp. 1-10 (or 45-54)-Issue Date: 2002, Date of Current Version: Jan. 6, 2003.
Papadopoulos et al.,"NPACI Rocks: Tools and Techniques for Easily Deploying Manageable Linux Clusters", The San Diego Supercomputer Center, University of California San Diego, La Jolla, CA 92093-0505-Issue Date: 2001, Date of Current Version: Aug. 7, 2002.
Ruth et al., Virtual Distributed Environments in a Shared Infrastructure, pp. 63-69, IEEE Computer Society, May 2005.
Rouiller, Virtual LAN Security: weaknesses and countermeasures, pp. 1-49, GIAC Security Essentials Practical Assignment Version 1.4b (2006).
Walters et al., An Adaptive Heterogeneous Software DSM, pp. 1-8, Columbus, Ohio, Aug. 14-Aug. 18, 2006.
Skyrme et al., Exploring Lua for Concurrent Programming, pp. 3556-3572, Journal of Universal Computer Science, vol. 14, No. 21 (2008), submitted: Apr. 16, 2008, accepted: May 6, 2008, appeared: Jan. 12, 2008.
Dobre, Multi-Architecture Operating Systems, pp. 1-82, Oct. 4, 2004.
Int'l Searching Authority; Int. Appin. PCT/IB2012/051803; Int'l Search Report dated Sep. 13, 2012 (7 pg.).

(56) References Cited

OTHER PUBLICATIONS

U.S. Appl. No. 13/107,893, Notice of Allowance Dated Jul. 10, 2013.
U.S. Appl. No. 13/107,893, Non-Final Office Action Dated Apr. 1, 2013.
U.S. Appl. No. 13/472,964, Notice of Allowance Dated Jul. 12, 2013.
U.S. Appl. No. 13/472,964, Non-Final Office Action Dated Mar. 29, 2013.
U.S. Appl. No. 13/107,903, Notice of Allowance Dated Sep. 11, 2013.
U.S. Appl. No. 13/107,903, Final Office Action Dated Jul. 19, 2013.
U.S. Appl. No. 13/107,903, Non-Final Office Action Dated Feb. 22, 2013.
U.S. Appl. No. 13/585,446, Notice of Allowance Dated Sep. 12, 2013.
U.S. Appl. No. 13/585,446, Final Office Action Dated Jul. 19, 2013.
U.S. Appl. No. 13/585,446, Non-Final Office Action Dated Feb. 16, 2013.

\* cited by examiner

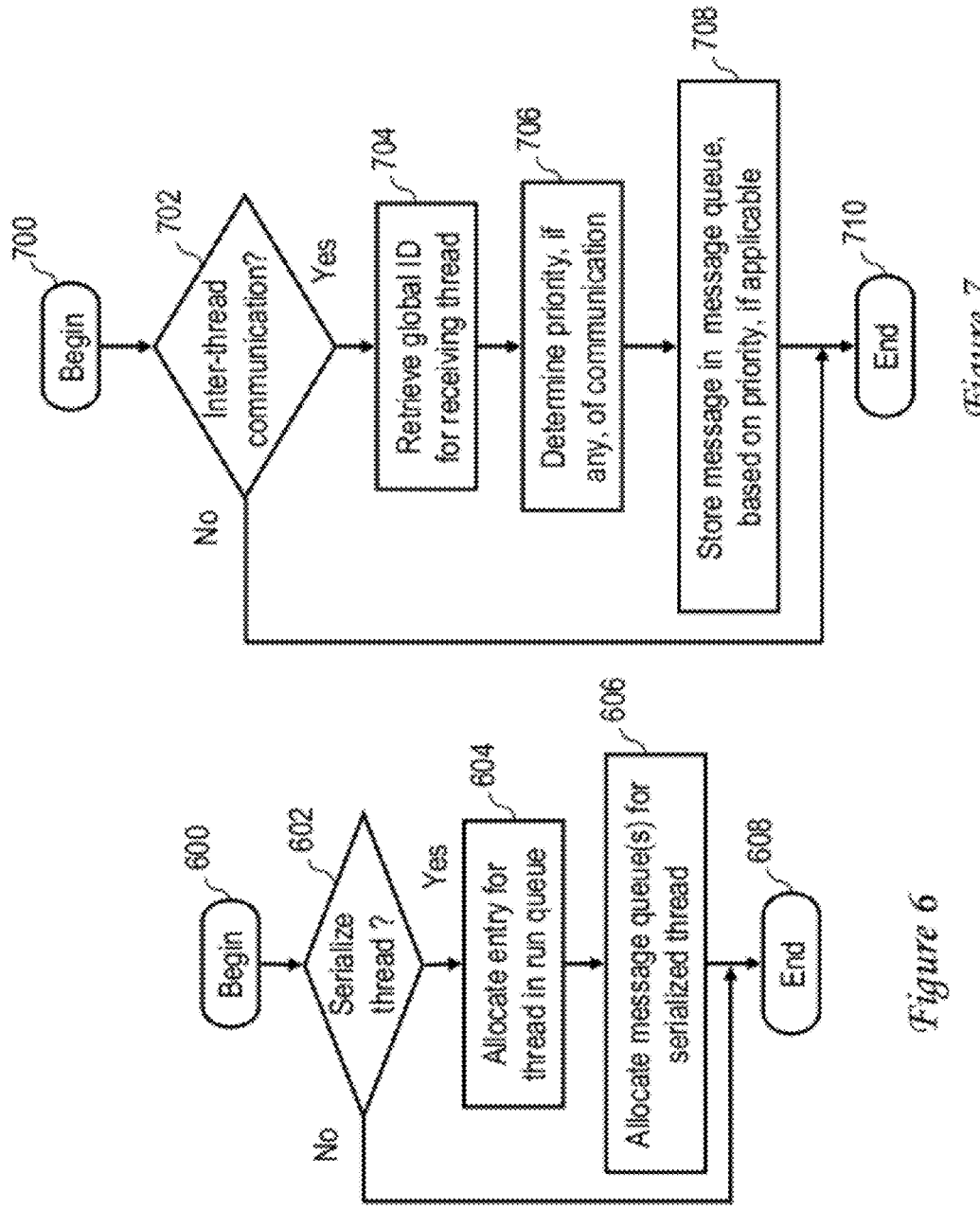

TECHNIQUES FOR EXECUTING NORMALLY INTERRUPTIBLE THREADS IN A NON-PREEMPTIVE MANNER

PRIORITY CLAIM

This application is a continuation of U.S. patent application Ser. No. 13/107,896, filed on May 14, 2011, entitled "Techniques For Executing Threads In A Computing Environment," which is incorporated herein by reference in its entirety for all purposes.

BACKGROUND OF THE INVENTION

1. Technical Field

The present invention relates in general to threads and, in particular to, techniques for executing threads in a computing environment.

2. Description of the Related Art

The term 'utility computing' has been used to refer to a computational model in which processing, storage and network resources, software, and data are accessible to client computer systems and other client devices (e.g., mobile phones or media players) on demand, much like familiar residential utility services, such as water and electricity. In some implementations, the specific computational resources (e.g., servers, storage drives, etc.) allocated for access and use by client devices are specified by service agreements between the utility computing provider and its customers. In other implementations, commonly referred to as "cloud computing," details of the underlying information technology (IT) infrastructure are transparent to the utility computing customers.

Cloud computing is facilitated by ease-of-access to remote computing websites (e.g., via the Internet or a private corporate network) and frequently takes the form of web-based resources, tools, or applications that a cloud consumer can access and use through a web browser, as if the resources, tools, or applications were a local program installed on a computer system of the cloud consumer. Commercial cloud implementations are generally expected to meet quality of service (QoS) requirements of cloud consumers, which may be specified in service level agreements (SLAs). In a typical cloud implementation, cloud consumers consume computational resources as a service and pay only for the resources used.

Adoption of utility computing has been facilitated by the widespread utilization of virtualization, which is the creation of virtual (rather than actual) versions of computing resources, e.g., an operating system, a server, a storage device, network resources, etc. For example, a virtual machine (VM), also referred to as a logical partition (LPAR), is a software implementation of a physical machine (e.g., a computer system) that executes instructions like a physical machine. VMs can be categorized as system VMs or process VMs. A system VM provides a complete system platform that supports the execution of a complete operating system (OS), such as Windows, Linux, AIX, Android, etc., as well as its associated applications. A process VM, on the other hand, is usually designed to run a single program and support a single process. In either case, any application software running on the VM is limited to the resources and abstractions provided by that VM. Consequently, the actual resources provided by a common IT infrastructure can be efficiently managed and utilized through the deployment of multiple VMs, possibly associated with multiple different utility computing customers.

The virtualization of actual IT resources and management of VMs is typically provided by software referred to as a VM monitor (VMM) or hypervisor. In various implementations, a VMM may run on bare hardware (Type 1 or native VMM) or on top of an operating system (Type 2 or hosted VMM).

In a typical virtualized computing environment, VMs can communicate with each other and with physical entities in the IT infrastructure of the utility computing environment utilizing conventional networking protocols. As is known in the art, conventional networking protocols are commonly premised on the well known seven layer Open Systems Interconnection (OSI) model, which includes (in ascending order) physical, data link, network, transport, session, presentation, and application layers. VMs are enabled to communicate with other network entities as if the VMs were physical network elements through the substitution of a virtual network connection for the conventional physical layer connection.

The UNIX® operating system (OS) was designed to be a portable, multi-tasking, and multi-user OS. UNIX is characterized by: the use of plain text for storing data; a hierarchical file system; treating devices and certain types of inter-process communications (IPCs) as files; and the use of a large number of software tools. UNIX includes various utilities along with a master control program, i.e., the UNIX kernel. The UNIX kernel provides services to start and stop programs, handles the file system and other common low-level tasks that most programs share, and schedules access to hardware to avoid conflicts if multiple programs try to access the same resource or device simultaneously. Because of the acknowledged security, portability and functionality of UNIX, a large number of similar operating system have been developed, including Linux™, Minix™, Mac OS™, FreeBSD™, NetBSD™, OpenBSD™, AIX™, Solaris™, and HP/UX™. All of these operating systems, together with UNIX, are referred to herein as "Unix-like" OSs. Unix-like OSs can be installed on a wide variety of hardware, e.g., mobile phones, tablet computers, video game consoles, networking gear, mainframes, and supercomputers.

In computer science, a thread of execution (thread) is usually the smallest unit of processing that can be scheduled by an OS. A thread generally results from a fork of a computer program into two or more concurrently running tasks. The implementation of threads and processes may differ between OSs, but in most cases a thread is included within a process. Multiple threads can exist within the same process and share resources (e.g., memory), while different processes do not share the same resources. On a single processor system, multi-threading is implemented through time-division multiplexing (i.e., a processor switches between executing different threads). On a multi-processor or multi-core system, multiple threads may run at the same time on different processors or processor cores. Many modern OSs directly support both time-sliced and multi-processor threading with a process scheduler. The kernel of an OS allows programmers to manipulate threads via a system call interface.

Portable operating system interface for UNIX (POSIX) is the name of a family of related standards that define an application programming interface (API), along with shell and utilities interfaces, for software compatible with Unix-like OSs. POSIX threads (pthreads) refer to threads that are compliant with the POSIX standard for threads (i.e., POSIX.1c (IEEE 1003.1c-1995), which defines an API for creating and manipulating threads). Implementations of the POSIX API are available on many Unix-like POSIX-conformant OSs, e.g., FreeBSD™, NetBSD™, GNU/Linux™, Mac OS X™, and Solaris™.

SUMMARY OF THE INVENTION

A technique for executing normally interruptible threads of a process in a non-preemptive manner includes in response to a first entry associated with a first message for a first thread reaching a head of a run queue, receiving, by the first thread, a first wake-up signal. In response to receiving the wake-up signal, the first thread waits for a global lock. In response to the first thread receiving the global lock, the first thread retrieves the first message from an associated message queue and processes the retrieved first message. In response to completing the processing of the first message, the first thread transmits a second wake-up signal to a second thread whose associated entry is next in the run queue. Finally, following the transmitting of the second wake-up signal, the first thread releases the global lock.

BRIEF DESCRIPTION OF THE DRAWINGS

FIG. 6 is a high level logical flowchart of an exemplary method of operating an operating system (OS) scheduler of a physical network switch configured in accordance with one embodiment;

FIG. 7 is a high level logical flowchart of an exemplary method of performing inter-thread communication in a physical network switch configured in accordance with one embodiment.

DETAILED DESCRIPTION OF ILLUSTRATIVE EMBODIMENT

Figure 1:
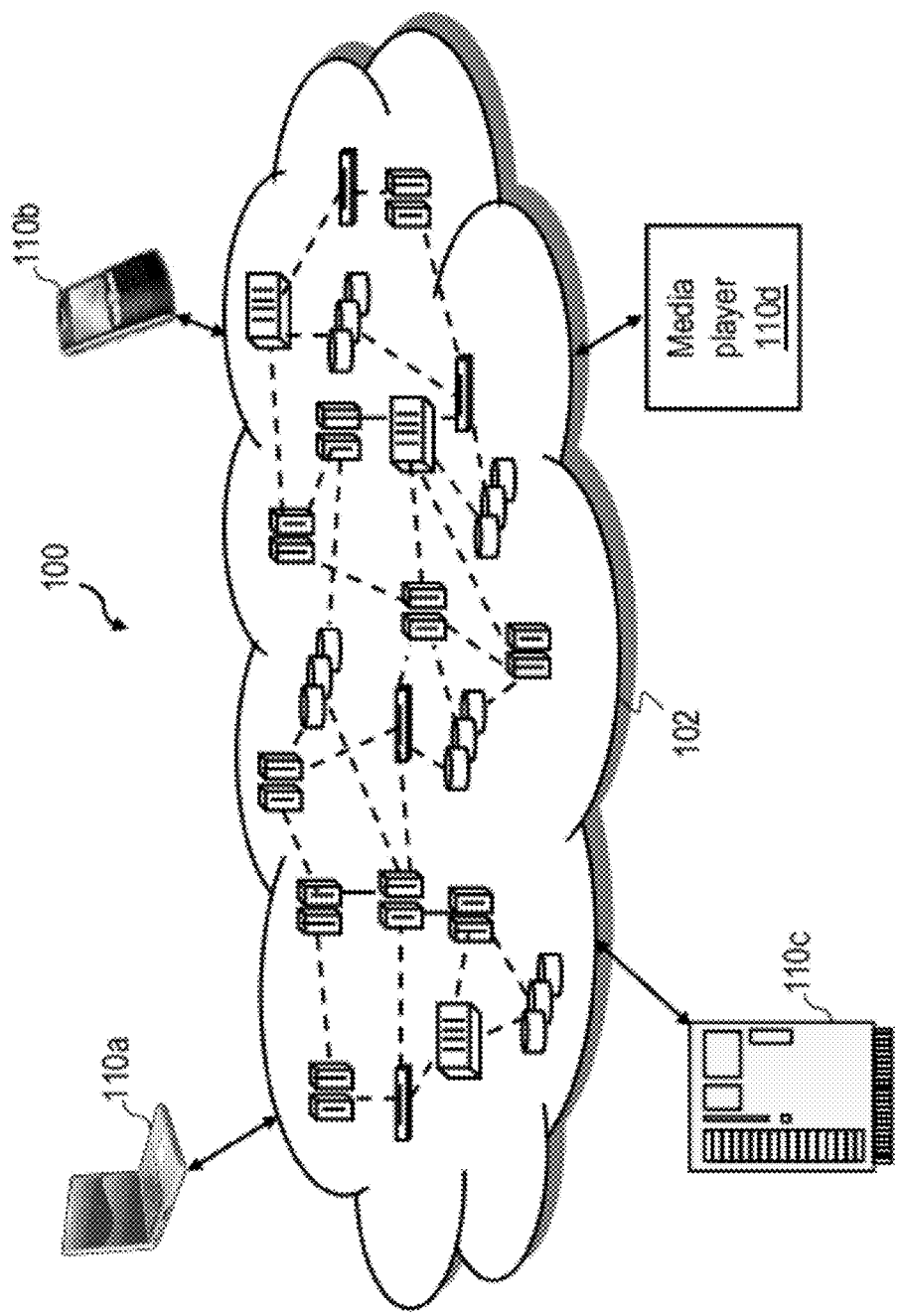
FIG. 1 is a high level block diagram of a data processing environment in accordance with one embodiment.

According to the present disclosure, techniques are disclosed that facilitate running legacy software (i.e., a legacy bare metal OS) on top of a Unix-like OS, such as Linux. In various cases, running legacy software on top of a Unix-like OS enables reuse of certain legacy code, while improving scalability through access to a multi-core, multi-processor OS. While the discussion herein is directed to running legacy software on top of a Unix-like OS in a physical network switch that is implemented in a virtualized computing environment, it is contemplated that the techniques disclosed herein are broadly applicable to virtualized and non-virtualized computing environments and may be implemented in devices other than physical network switches. As used herein, a 'stem thread' refers to a legacy proprietary user-space thread that ran non-preemptively (i.e., that was uninterruptible) in a serialized manner in an order that messages were posted to a stem message queue (provided by the legacy software). The legacy software also implemented a stem dispatcher that was in charge of processing stem messages and scheduling stem threads. As used herein, the term 'pthreads', by itself, refers to Unix-like OS threads that run preemptively (i.e., interruptible) in no particular order within a priority class and that are normally completely controlled by an OS scheduler of a Unix-like OS. As is also used herein, a 'stem pthread' is a stem thread that has been converted to be similar to a pthread.

To ensure application code compatibility, restrictions are enforced on stem pthreads that differentiate stem pthreads from pthreads. One restriction serializes stem pthreads by employing a global mutual exclusion (mutex) that functions as a global lock to cause stem pthreads to run like stem threads (i.e., as uninterruptible threads). That is, only one stem pthread (i.e., the stem pthread with the global lock) can process a message at any given time. Another restriction causes stem pthreads to self-regulate by waiting (after being woke-up) for a global lock before performing message processing. To ensure that stem pthreads get scheduled in the same order as the messages are posted (to emulate the legacy software), a single run queue is maintained for all stem pthreads with messages to be processed. In various embodiments, all stem pthreads sleep while waiting for an associated message to reach a head of the run queue. In one or more embodiments, each stem pthread is configured to: run a continuous entry function that waits for a global lock; process one message in an associated message queue upon receiving the global lock; and then relinquish the global lock.

Before an active stem pthread goes back to sleep, the active stem pthread is configured to check the run queue and wake-up a stem pthread associated with a next entry in the run queue. This ensures that when the global lock is released by the active stem pthread, a stem pthread associated with a next entry in the run queue retrieves the global lock and begins executing an associated message processing function. Before an active stem pthread goes back to sleep, the active stem pthread is also configured to check an associated message queue and if the active stem pthread has additional messages to process, the active stem pthread queues an entry for one of the additional messages to the end of the run queue. When the additional message reaches the head of the run queue at a subsequent time, the stem pthread receives a wake-up signal and begins processing the additional message. For example, an entry in the run queue may correspond to a global identifier (ID) for a given stem pthread.

In contrast to the legacy software discussed above, software configured according to the present disclosure does not implement stem thread dispatcher code, as the Unix-like OS scheduler performs basic thread scheduling. The Unix-like OS scheduler maintains various background information on scheduled threads and an API layer (that executes on top of the Unix-like OS scheduler) maintains housekeeping information (e.g., whether a scheduled thread is a stem pthread or a pthread). According to the present disclosure, each thread (i.e., stem pthreads and pthreads) includes code that is configured to process associated message queues and messages. Any new modules written for the system may employ pthreads that are not (usually) restricted. For example, if pthreads implement their own locks, the pthreads can run independently on the parts of the code that are not shared with common data structures. If a pthread needs to access any data structure that is shared with a stem pthread, the pthread can be temporarily serialized by placing the pthread on the run queue and waiting for the global lock when the pthread is woken-up.

Communication between pthreads and stem pthreads may be implemented in a number of different ways. For example, inter-thread communication may be achieved on the send side using stem messages (which include a command and a message), an OS interface (OSIX) event send call (which includes a command and a message pointer for a thread with a single associated message queue), or an OSIX event queue send call (which includes a command and a message pointer for a thread with multiple associated message queues). In various embodiments, a sending thread is configured to store a message for a receiving thread in a message queue associated with the receiving thread. In determining a message queue for a receiving thread, a sending thread may, for example, employ an API to retrieve a global thread ID for the receiving thread (which also indicates, for example, a location for a message queue for the receiving thread) from a data structure (e.g., a table, which may be maintained by an API layer that executes on top of the Unix-like OS scheduler).

In one or more embodiments, stem pthreads receive messages (i.e., stem messages or OSIX messages) from a wrapper routine, which dequeues the message from an associated message queue of the stem pthread and calls an entry routine of the stem pthread with the message as a parameter. The wrapper routine may, for example, be implemented as a Unix-like OS module. In one or more embodiments, pthreads wait on blocking condition variables when receiving messages. When a blocking condition variable is signaled, a pthread reads an event and retrieves a message pointer to an associated message queue. In various embodiments, the pthreads use an OSIX event receive call or an OSIX event queue receive call to retrieve a message pointer. In order to facilitate transparent thread communication from an application layer perspective, applications may be configured to send stem messages or OSIX messages to any kind of receiver (i.e., stem pthreads or pthreads). When a stem message is destined for a pthread, the stem message is converted to an OSIX event condition and an OSIX queue message by a stem send routine (which may be implemented as a Unix-like OS module). When an OSIX message is destined for a stem pthread, the OSIX message is converted to a stem message by an OSIX send routine (which may be implemented as a Unix-like OS module). This ensures that both stem pthreads and pthreads can maintain their receive processing in an unmodified state. Since the mechanism for message conversion is hidden, with respect to application code, application code does not require modification.

With reference now to the figures and with particular reference to FIG. 1, there is illustrated a high level block diagram of an exemplary data processing environment 100 in accordance within one embodiment of the present disclosure. As shown, data processing environment 100, which in the depicted embodiment is a cloud computing environment, includes a collection of computing resources commonly referred to as a cloud 102. Computing resources within cloud 102 are interconnected for communication and may be grouped (not shown) physically or virtually, in one or more networks, such as private, community, public, or hybrid clouds or a combination thereof. In this manner, data processing environment 100 can offer infrastructure, platforms and/or software as services accessible to client devices 110, such as personal (e.g., desktop, laptop, netbook, tablet, or handheld) computers 110a, smart phones 110b, server computer systems 110c and consumer electronics 110d, such as media players (e.g., set top boxes, digital versatile disk (DVD) players, or digital video recorders (DVRs)). It should be understood that the types of client devices 110 shown in FIG. 1 are illustrative only and that client devices 110 can be any type of electronic device capable of communicating with and accessing services of computing resources via a packet network.

Figure 2:
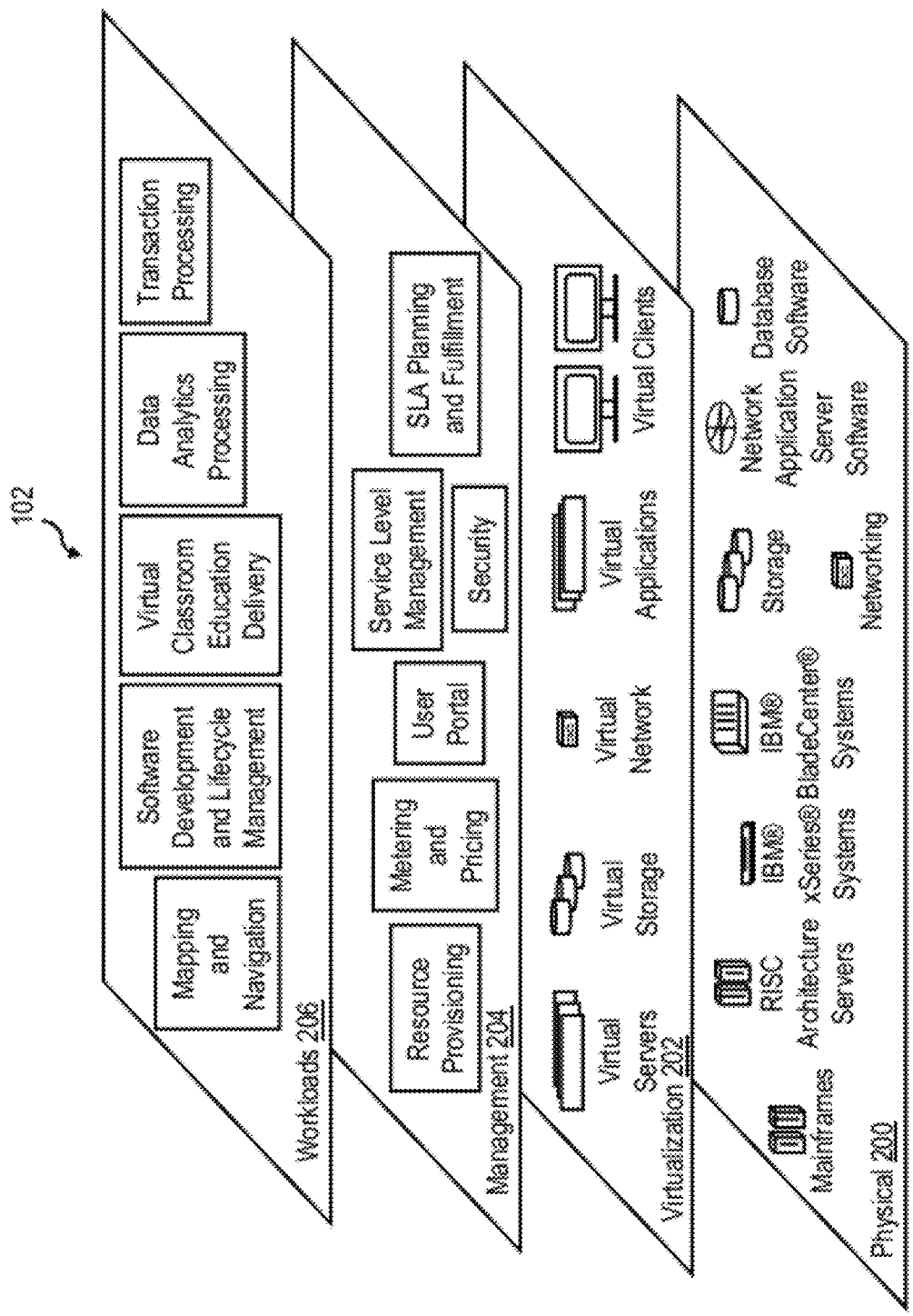
FIG. 2 depicts the layering of virtual and physical resources in the exemplary data processing environment of FIG. 1 in accordance with one embodiment.

FIG. 2 is a layer diagram depicting the virtual and physical resources residing in collection of cloud 102 of FIG. 1 in accordance with one embodiment. It should be understood that the computing resources, layers, and functions shown in FIG. 2 are intended to be illustrative only and embodiments of the claimed inventions are not limited thereto.

As depicted, cloud 102 includes a physical layer 200, a virtualization layer 202, a management layer 204, and a workloads layer 206. Physical layer 200 includes various physical hardware and software components that can be used to instantiate virtual entities for use by the cloud service provider and its customers. As an example, the hardware components may include mainframes (e.g., IBM® zSeries® systems), reduced instruction set computer (RISC) architecture servers (e.g., IBM pSeries® systems), IBM xSeries® systems, IBM BladeCenter® systems, storage devices (e.g., flash drives, magnetic drives, optical drives, tape drives, etc.), physical networks, and networking components (e.g., routers, switches, etc.). The software components may include operating system software (e.g., AIX, Windows, Linux, etc.), network application server software (e.g., IBM WebSphere® application server software, which includes web server software), and database software (e.g., IBM DB2® database software). IBM, zSeries, pSeries, xSeries, BladeCenter, WebSphere, and DB2 are trademarks of International Business Machines Corporation registered in many jurisdictions worldwide.

The computing resources residing in physical layer 200 of cloud 102 are virtualized and managed by one or more virtual machine monitors (VMMs) or hypervisors. The VMMs present a virtualization layer 202 including virtual entities (e.g., virtual servers, virtual storage, virtual networks (including virtual private networks)), virtual applications, and virtual clients. As discussed previously, these virtual entities, which are abstractions of the underlying resources in physical layer 200, may be accessed by client devices 110 of cloud consumers on-demand.

The VMM(s) also support a management layer 204 that implements various management functions for the cloud 102. These management functions can be directly implemented by the VMM(s) and/or one or more management or service VMs running on the VMM(s) and may provide functions such as resource provisioning, metering and pricing, security, user portal services, service level management, and SLA planning and fulfillment. The resource provisioning function provides dynamic procurement of computing resources and other resources that are utilized to perform tasks within the cloud computing environment. The metering and pricing function provides cost tracking (as resources are provisioned and utilized within the cloud computing environment) and billing or invoicing for consumption of the utilized resources. As one example, the utilized resources may include application software licenses. The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 206, which may be implemented by one or more consumer VMs, provides examples of functionality for which the cloud computing environment may be utilized. Examples of workloads and functions which may be provided from workloads layer 206 include: mapping and navigation;

software development and lifecycle management; virtual classroom education delivery; data analytics processing; and transaction processing.

Figure 3:
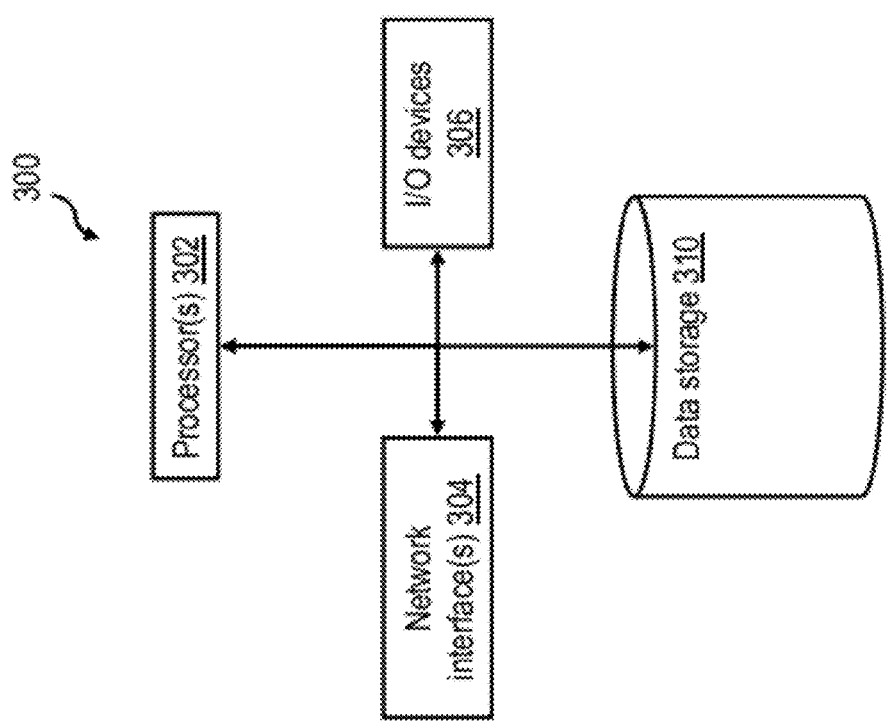
FIG. 3 is a high level block diagram of a data processing system in accordance with one embodiment.

With reference now to FIG. 3, there is illustrated a high level block diagram of an exemplary data processing system 300 that can be utilized to implement a physical host computing platform in physical layer 200 of FIG. 2 or a client device 110 of FIG. 1. In the illustrated exemplary embodiment, data processing system 300 includes one or more network interfaces 304 that permit data processing system 300 to communicate with one or more computing resources in cloud 102 via cabling and/or one or more wired or wireless, public or private, local or wide area networks (including the Internet). Data processing system 300 additionally includes one or more processors 302 that process data and program code, for example, to manage, access and manipulate data or software in data processing environment 100. Data processing system 300 also includes input/output (I/O) devices 306, such as ports, displays, and attached devices, etc., which receive inputs and provide outputs of the processing performed by data processing system 300 and/or other resource(s) in data processing environment 100. Finally, data processing system 300 includes data storage 310, which may include one or more volatile or non-volatile storage devices, including memories, solid state drives, optical or magnetic disk drives, tape drives, etc. Data storage 310 may store, for example, software within physical layer 200 and/or software, such as a web browser, that facilitates access to workloads layer 206 and/or management layer 204.

Figure 4:
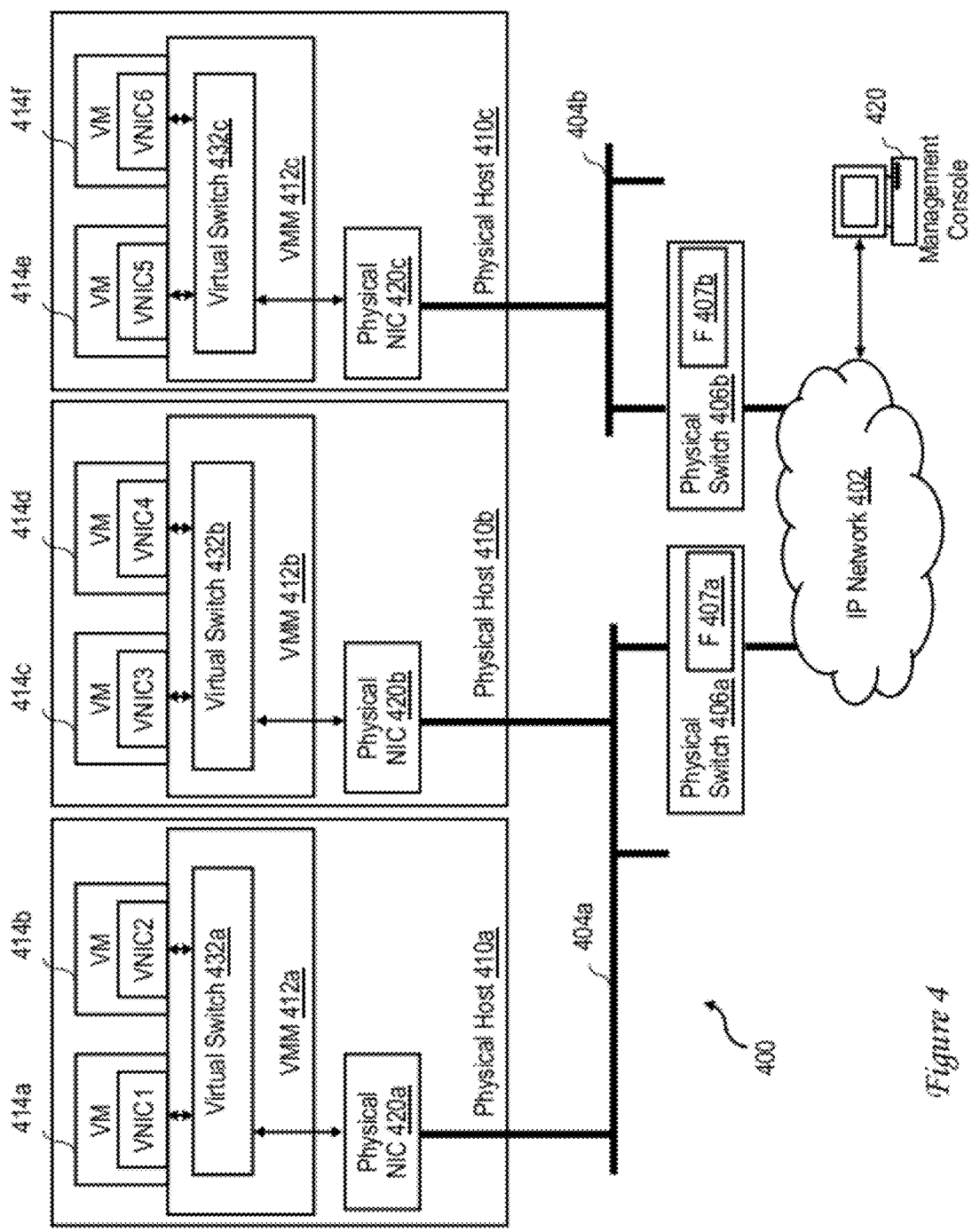
FIG. 4 is a high level block diagram of a portion of a data processing environment employing physical network switches configured in accordance with one embodiment.

Referring now to FIG. 4, there is depicted a high level block diagram of a portion of a data processing environment 400 employing physical network switches configured in accordance with one or more embodiments of the present disclosure. For example, data processing environment 400 can implement a portion of cloud 102 depicted in FIG. 1.

In the depicted embodiment, data processing environment 400 includes an Internet protocol (IP) network 402 including a plurality of network segments 404a, 404b, each of which is coupled to a respective one of physical network switches 406a, 406b. As is depicted, each of physical network switches 406a, 406b includes a respective data structure (e.g., a respective forwarding table (F)) 407a, 407b by which physical network switches 406a, 406b forward incoming data packets toward the packets' destinations based upon, for example, OSI Layer 2 (e.g., media access control (MAC)) addresses contained in the packets. As is discussed in further detail with reference to FIG. 8, physical network switches 406a, 406b are configured to run legacy software on top of a Unix-like OS. As noted above, legacy stem threads are converted to stem pthreads and new modules are written to implement pthreads. Physical hosts 410a, 410b are coupled to network segment 404a and physical host 410c is coupled to network segment 404b. Each of physical hosts 410a-410c can be implemented, for example, utilizing a data processing system 300 as depicted in FIG. 3.

Each of physical hosts 410a-410c executes a respective one of VMM 412a-412c, which virtualizes and manages the resources of its respective physical host 410, for example, under the direction of a human and/or automated cloud administrator at a management console 420 coupled to physical hosts 410a-410c by IP network 402. VMM 412a on physical host 410a supports the execution of VMs 414a-414b, VMM 412b on physical host 410b supports the execution of VMs 414c-414d, and VMM 412c on physical host 410c supports the execution of VMs 414e-414f. It should be appreciated the while two VMs are illustrated as being deployed on each of physical hosts 410a-410c, more or less than two VMs may be deployed on a physical host. In various embodiments, VMs 414a-414f can include VMs of one or more cloud consumers and/or a cloud provider. In the depicted embodiment, each of VMs 414 has one (and may include multiple) virtual network interface controller VNIC1-VNIC6, which provides network connectivity at least at Layers 2 and 3 of the OSI model.

VM 414a utilizes VNIC1 to facilitate communication via a first port of virtual switch 432a and VM 414b utilizes VNIC2 to facilitate communication via a second port of virtual switch 432a. For example, when the first and second ports of virtual switch 432a are configured as virtual Ethernet bridge (VEB) ports, communications between VM 414a and VM 414b may be completely routed via software (e.g., using memory copy operations). As another example, when the first and second ports of virtual switch 432a are configured as virtual Ethernet port aggregator (VEPA) ports, communications between VM 414a and VM 414b are routed through physical NIC 420a and on network segment 404a to physical switch 406a, which routes the communications back to virtual switch 432a via network segment 404a and physical NIC 420a. Similarly, VM 414c and VM 414d utilize VNIC3 and VNIC4, respectively, to facilitate communication via different ports of virtual switch 432b. Likewise, VM 414e and VM 414f utilize VNIC5 and VNIC6, respectively, to communicate via different ports of virtual switch 432c.

Figure 5:
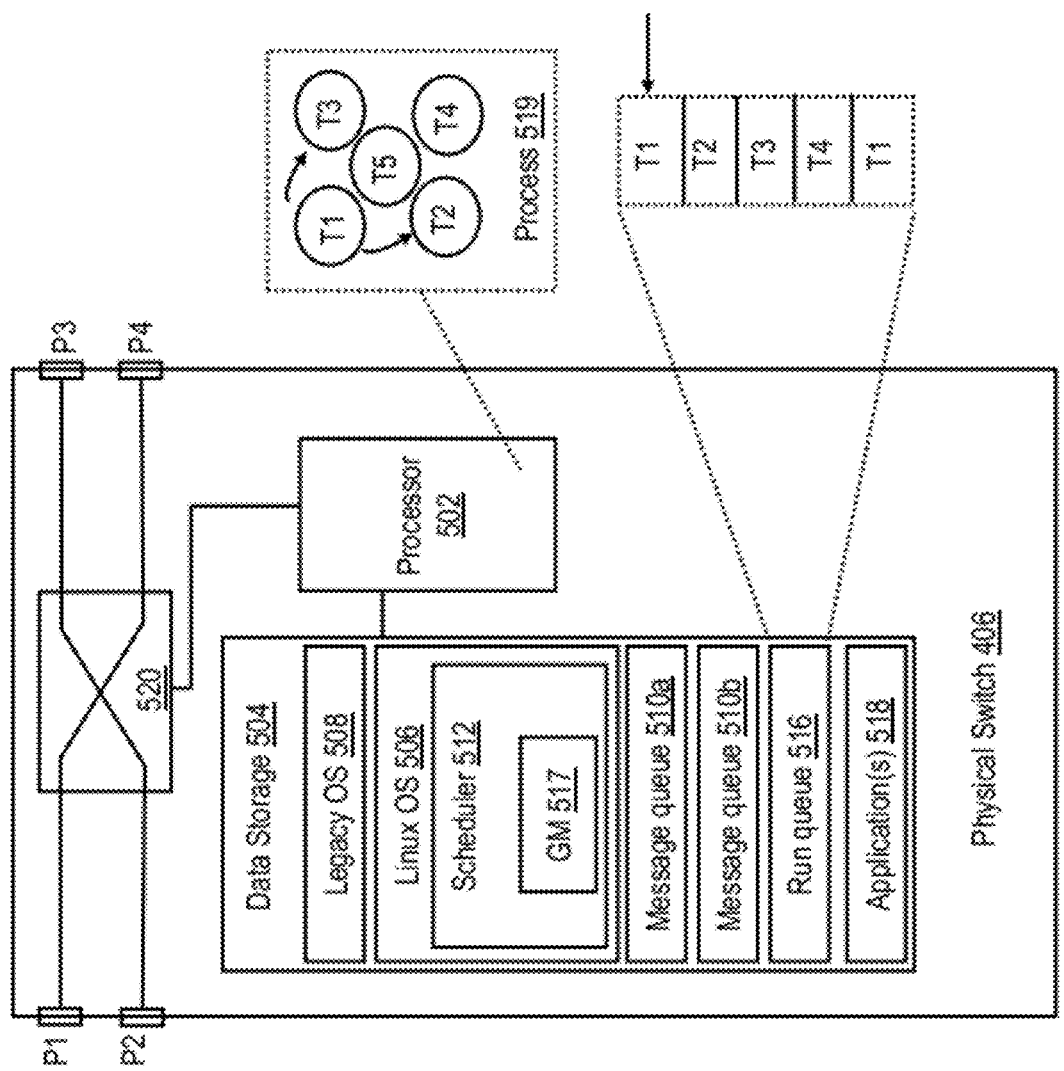
FIG. 5 is a block diagram of a relevant portion of a physical network switch configured in accordance with one embodiment.

Referring now to FIG. 5, a relevant portion of physical network switch 406 in data processing environment 400 of FIG. 4 is depicted in accordance with one embodiment of the present disclosure. As is illustrated, physical network switch 406 includes four ports (labeled P1-P4), a crossbar switch 520, a processor 502, and a data storage (e.g., a memory subsystem) 504. While physical network switch 406 is shown with four ports, it should be appreciated that a physical network switch configured according to the present disclosure may include more or less than four ports. Processor 502, which is coupled to crossbar switch 510, controls crossbar switch 520 to switch traffic between ports P1-P4.

Data storage 504 includes a legacy OS 508 that runs on top of a Unix-like OS (hereafter assumed to be Linux OS 506, which implements a scheduler 512 that employs a global mutex (GM) 517 that functions as a global lock) and an implementation appropriate number of applications 518. Processor 502 executes a process 519, which is illustrated as including five threads T1-T5. Thread T1 is shown in communication with threads T1 and T3. For example, thread T1 may communicate a wake-up signal to thread T2 (see FIG. 8), when thread T2 has a message whose associated entry is next in run queue 516. As another example, thread T1 may communicate with thread T3 (by storing a message for thread T3 in a message queue 510 associated with thread T3) according to the process of FIG. 7. As is illustrated, two message queues 510a, 510b and run queue 516 are allocated (by Linux OS 506) within data storage 504. While only two message queues 510a, 510b are illustrated in FIG. 5, it should be appreciated that more or less than two message queues may be implemented in a physical network switch configured according to the present disclosure. In a typical case, each scheduled thread has at least one allocated message queue. Message queues 510 are used to store messages for stem pthreads (and may be used to store messages for Linux pthreads that have been serialized) according to the present disclosure.

In one or more embodiments, scheduler 512 implements a routine that allocates GM 517 to a single thread at any given point in time. The GM 517 functions as a global lock to cause stem pthreads (which are normally interruptible threads) and Linux pthreads that have been serialized (e.g., for accessing a common data structure with one or more stem pthreads) to run like stem threads (i.e., as uninterruptible, serialized threads). As is illustrated (in the exploded view) of run queue 516, run queue 516 includes associated entries for five messages for four threads (i.e., threads T1-T4) that are included in process 519. In the illustrated example, thread T5 represents a regular Linux thread that is included in process 519 that remains interruptible. As depicted, an entry associated with a first message for thread T1 is allocated (e.g., by scheduler 512) at a head (indicated with an arrow) of run queue 516 and an entry associated with a second message for thread T1 is allocated at a tail of run queue 516. Associated entries for threads T2, T3, and T4, respectively, are allocated entries (by scheduler 512) in run queue 516 between the head and the tail of run queue 516. As is discussed in further detail in FIG. 8, messages for the threads T1-T4 are serially processed in the order of the associated entries in run queue 516.

As noted above, to ensure compatibility with applications 518, restrictions are enforced on stem pthreads that differentiate stem pthreads from Linux pthreads. To ensure that stem pthreads get scheduled in the same order as the messages are posted (to emulate the legacy software), an associated entry in run queue 516 is maintained for each stem pthread message that requires processing. In one or more embodiments, a stem pthread (or serialized Linux pthread) may have more than one associated message queue 510, each of which has a different priority. In this case, messages with a higher priority may be routed (by, for example, a sending thread) to a higher priority message queue and messages with a lower priority may be routed to a lower priority message queue. In this case, messages in a higher priority message queue, if any, are processed before messages in a lower priority message queue.

Scheduler 512, implemented within Linux OS 506, maintains various background information on scheduled threads and an API layer (that executes on top of the scheduler 512) maintains housekeeping information (e.g., whether a scheduled thread is a stem pthread or a Linux pthread). As noted above, according to one or more aspects of the present disclosure, when a thread is a stem pthread, the thread always requires serialization. According to the present disclosure, each thread (i.e., stem pthreads and Linux pthreads) includes code that is configured to process messages within message queues 510. As mentioned above, new software modules that are added to physical network switch 406 may employ Linux pthreads. As noted above, when a Linux pthread needs to access any data structure that is shared with a stem pthread, the Linux pthread can be temporarily serialized by creating an entry for the Linux pthread in run queue 516. For example, threads T1 and T4 may be stem pthreads and threads T2 and T3 may be serialized Linux pthreads.

With reference now to FIG. 6, there is illustrated a high level logical flowchart of an exemplary method of determining whether threads in a computing environment require serialization in accordance with one embodiment of the present disclosure. As previously mentioned, threads that require serialization my be stem pthreads or Linux pthreads that require access to a data structure that is shared with a stem pthread. The flowchart of FIG. 6 depicts steps in logical rather than strictly chronological order. Thus, in at least some embodiments, at least some steps of a logical flowchart can be performed in a different order than illustrated or concurrently. The process illustrated in FIG. 6 can be performed by Linux OS 506 of each physical network switch 406 in data processing environment 400 of FIG. 4.

The process begins at block 600 and then proceeds to decision block 602, where Linux OS 506 determines whether a thread that is to be scheduled requires serialization. In response to thread not requiring serialization in block 602, control transfers to block 608. In response to the thread requiring serialization in block 602, control transfers to block 604. In block 604, Linux OS 506 allocates an entry for the thread in run queue 516. Then, in block 606, Linux OS 506 allocates one or more message queues 510 for the thread. For example, a single message queue may be allocated when a thread does not receive messages with different priorities. As another example, a high priority message queue and a low priority message queue may be allocated when a thread receives messages with two different priorities. Following block 606, control passes to block 608 where the process depicted in FIG. 6 ends.

With reference now to FIG. 7, there is illustrated a high level logical flowchart of an exemplary method of performing inter-thread communication in a computing environment in accordance with one embodiment of the present disclosure. In this case, the serialized threads may be stem pthreads or Linux pthreads that require access to a data structure that is shared with a stem pthread. The flowchart of FIG. 7 depicts steps in logical rather than strictly chronological order. Thus, in at least some embodiments, at least some steps of a logical flowchart can be performed in a different order than illustrated or concurrently. The process illustrated in FIG. 7 can be performed by, for example, each physical network switch 406 in data processing environment 400 of FIG. 4.

The process begins at block 700 and then proceeds to decision block 702, where a sending thread (e.g., thread T1) determines whether an inter-thread communication (e.g., to share data) is indicated. In response to an inter-thread communication not being indicated in block 702, control transfers to block 710, where the process depicted in FIG. 7 ends. In response to an inter-thread communication being indicated in block 702, control transfers to block 704 where the sending thread retrieves (e.g., from scheduler 512) a global ID (which indicates a particular message queue 510) for a receiving thread (e.g., thread T3). Next, in block 706, the sending thread determines if a priority for the communication is indicated (i.e., whether the thread has multiple associated message queues 510). Then, in block 708, the sending thread stores a message for the receiving thread in a message queue 510 of the receiving thread. For example, if a low priority message is indicated (e.g., based on a traffic type), the message for the receiving thread is stored (by the sending thread) in a low priority message queue. Similarly, if a high priority message is indicated, the message for the receiving thread is stored (by the sending thread) in a high priority message queue. Following block 708, control passes to block 710 where the process depicted in FIG. 7 ends.

Figure 8:
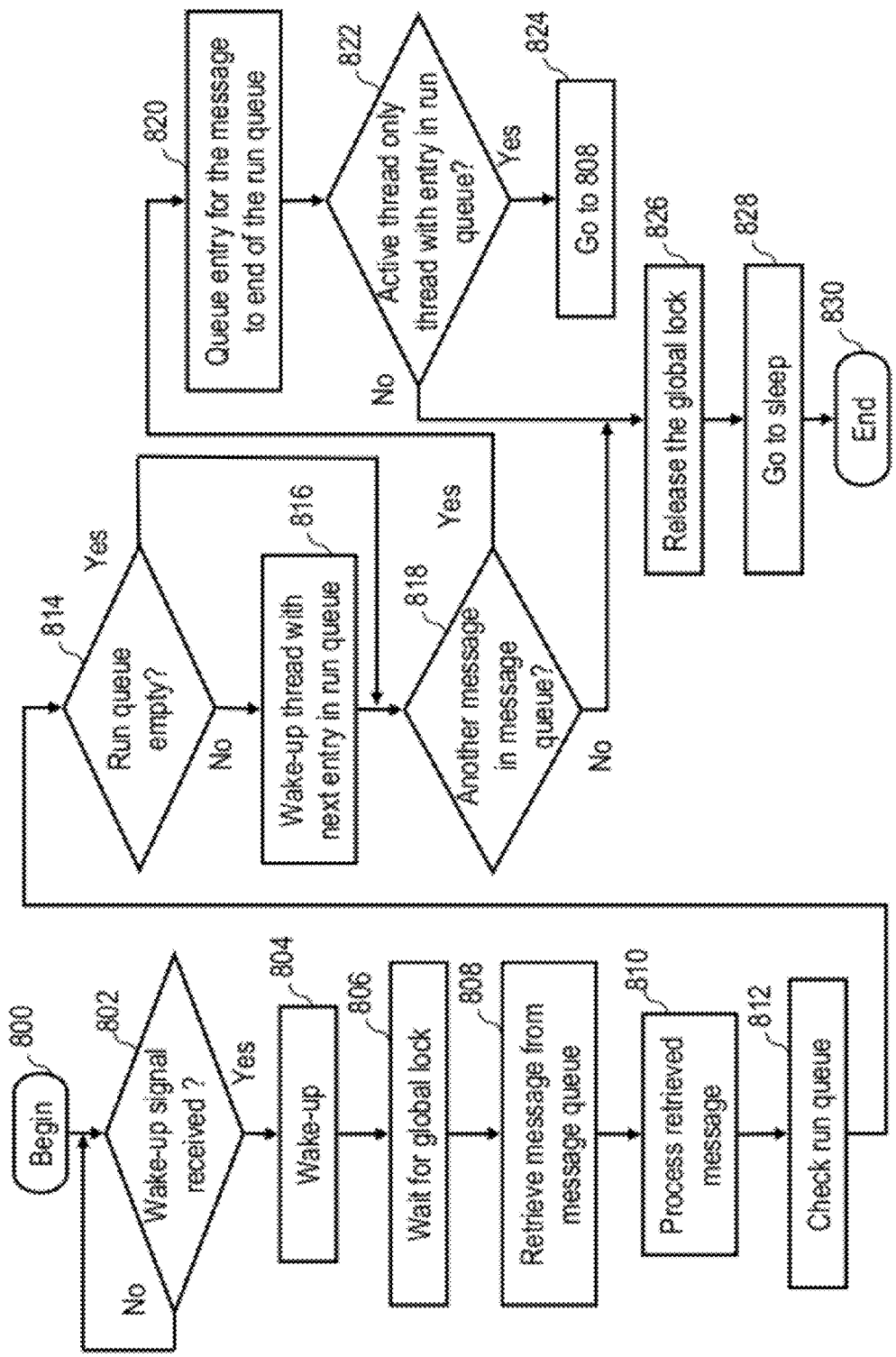
FIG. 8 is a high level logical flowchart of an exemplary method of executing threads in a physical network switch configured in accordance with one embodiment.

With reference now to FIG. 8, there is illustrated a high level logical flowchart of an exemplary method of executing a serialized thread in a computing environment in accordance with one embodiment of the present disclosure. The serialized thread may be a stem pthread or a Linux pthread that requires serialization to, for example, access a data structure that is shared with a stem pthread. The flowchart of FIG. 8 depicts steps in logical rather than strictly chronological order. Thus, in at least some embodiments, at least some steps of a logical flowchart can be performed in a different order than illustrated or concurrently. The process illustrated in FIG. 8 can be performed by, for example, each physical network switch 406 in data processing environment 400 of FIG. 4.

The process begins at block 800 and then proceeds to decision block 802, where a sleeping thread (e.g., thread T1 of process 519, which may be a stem pthread or a Linux pthread that has been serialized) determines whether a wake-up signal has been received (e.g., from another thread). As noted above, a sleeping thread receives a wake-up signal to process a message in response to an associated entry for the message reaching a head of run queue 516. In various embodiments, the wake-up signal for a sleeping thread is triggered following an event (e.g., receipt of a message for the first thread from another thread, arrival of a packet for the first thread, a timer expiration associated with the first thread, or establishment of a link for the first thread) and is generated subsequent to the associated entry for the message for the sleeping thread reaching the head of run queue 516. Next, in block 804, the sleeping thread wakes up in response to receiving the wake-up signal, thus becoming an active thread. Then, in block 806, the active thread waits to receive the global lock (GM 517) from scheduler 512. Upon receiving GM 517 from scheduler 512, the active thread retrieves the message from an associated message queue 510 in block 810 and processes the retrieved message in block 810.

Next, in block 812, the active thread checks run queue 516 for additional entries. Then, in block 814, the active thread determines whether run queue 516 is empty. In response to run queue 516 being empty in block 814, control transfers to decision block 818. In response to run queue 516 not being empty in block 814, control transfers to block 816 where the active thread wakes up another thread (e.g., thread T2) having a message associated with a next entry in run queue 516. Following block 816, control transfers to block 818. In block 818, the active thread determines whether it has another message in an associated message queue 510 to process. In response to the active thread not having another message to process in block 818, control transfers to block 826 where the active thread releases the global lock. In response to the active thread having another message to process in block 818, control transfers to block 820 where the active thread queues an associated entry for the message to an end of run queue 516.

Next, in decision block 822 the active thread determines whether it is the only thread with an entry in run queue 516. In response to the active thread determining that it is the only thread with an entry in run queue 516, the active thread continues the process of FIG. 8 at block 808 where a next message in an associated message queue 510 for the active thread is retrieved. In response to the active thread determining that it is not the only thread with an entry in run queue 516, control transfers to block 826 where the active thread releases the global lock. Next, in block 828, the active thread goes to sleep. Following block 828, control passes to block 830 where the process depicted in FIG. 8 ends.

In the event that it is desirable for an active thread to release the global lock even when no other thread currently has a message to be processed and the active thread currently has another message to be processed, blocks 822 and 824 may be omitted. In this case, the output of block 820 is routed directly to block 826.

Accordingly, techniques have been disclosed herein that facilitate seamless communication between multiple heterogeneous execution threads within a single process. The disclosed techniques also facilitate operating Linux pthreads as freely schedulable threads or as stem threads (i.e., Linux pthreads may serialized to be uninterruptible).

While the present invention has been particularly shown as described with reference to one or more preferred embodiments, it will be understood by those skilled in the art that various changes in form and detail may be made therein without departing from the spirit and scope of the invention. For example, it should be understood that although the detailed description provided herein provides multiple embodiments of cloud computing environments, the teachings disclosed herein are not limited to cloud computing environments. Rather, embodiments can be implemented in any other type of computing environment now known or later developed, including client-server and peer-to-peer computing environments. The disclosed techniques are broadly applicable to virtualized and non-virtualized computing environments and may be implemented in devices (e.g., host platforms) other than physical network switches.

Further, although aspects have been described with respect to computer systems executing program code that direct the functions described herein, it should be understood that embodiments may alternatively be implemented as a program product including a storage medium (e.g., data storage 310) storing program code that can be processed by a data processing system to cause the data processing system to perform one or more of the described functions.

What is claimed is:

1. A method of executing normally interruptible threads of a process in a non-preemptive manner, comprising:
   in response to a first entry associated with a first message for a first thread reaching a head of a run queue, receiving, by the first thread, a first wake-up signal, wherein the first thread is a serialized stem pthread;
   in response to receiving the wake-up signal, waiting, by the first thread, for a global lock;
   in response to the first thread receiving the global lock, retrieving, by the first thread, the first message from an associated message queue;
   processing, by the first thread, the retrieved first message;
   in response to completing the processing of the first message, transmitting, by the first thread, a second wake-up signal to a second thread whose associated entry is next in the run queue, wherein the second thread is a serialized pthread that requires access to a data structure that is shared with the first thread;
   releasing, by the first thread, the global lock following the transmitting of the second wake-up signal;
   checking, by the first thread, the associated message queue for a second message for the first thread; and
   in response to the associated message queue including the second message, queuing a second entry associated with the second message to an end of the run queue.

2. The method of claim 1, wherein the first wake-up signal is triggered following an event.

3. The method of claim 2, wherein the event corresponds to one of: receipt of a message for the first thread from another thread, arrival of a packet for the first thread, a timer expiration associated with the first thread, and establishment of a link for the first thread.

4. A data processing system configured to execute normally interruptible threads of a process in a non-preemptive manner, the data processing system comprising:
   a data storage including program code; and
   a processor coupled to the data storage, wherein the program code, when executed by the processor, configures the processor for:
   in response to a first entry associated with a first message for a first thread reaching a head of a run queue, receiving, by the first thread, a first wake-up signal, wherein the first thread is a serialized stem pthread;
   in response to receiving the wake-up signal, waiting, by the first thread, for a global lock;
   in response to the first thread receiving the global lock, retrieving, by the first thread, the first message from an associated message queue;
   processing, by the first thread, the retrieved first message;

in response to completing the processing of the first message, transmitting, by the first thread, a second wake-up signal to a second thread whose associated entry is next in the run queue, wherein the second thread is a serialized pthread that requires access to a data structure that is shared with the first thread;

releasing, by the first thread, the global lock following the transmitting of the second wake-up signal;

checking, by the first thread, the associated message queue for a second message for the first thread; and in response to the associated message queue including the second message, queuing a second entry associated with the second message to an end of the run queue.

5. The data processing system of claim 4, wherein the first wake-up signal is triggered following an event.

6. The data processing system of claim 5, wherein the event corresponds to one of: receipt of a message for the first thread from another thread, arrival of a packet for the first thread, a timer expiration associated with the first thread, and establishment of a link for the first thread.

7. A program product including program code, embodied in a hardware data storage, for executing normally interruptible threads of a process in a non-preemptive manner, the program code, when executed by a data processing system, configuring the data processing system for:

in response to a first entry associated with a first message for a first thread reaching a head of a run queue, receiving, by the first thread, a first wake-up signal, wherein the first thread is a serialized stem pthread;

in response to receiving the wake-up signal, waiting, by the first thread, for a global lock;

in response to the first thread receiving the global lock, retrieving, by the first thread, the first message from an associated message queue;

processing, by the first thread, the retrieved first message;

in response to completing the processing of the first message, transmitting, by the first thread, a second wake-up signal to a second thread whose associated entry is next in the run queue, wherein the second thread is a serialized pthread that requires access to a data structure that is shared with the first thread;

releasing, by the first thread, the global lock following the transmitting of the second wake-up signal;

checking, by the first thread, the associated message queue for a second message for the first thread; and in response to the associated message queue including the second message, queuing a second entry associated with the second message to an end of the run queue.

8. The program product of claim 7, wherein the first wake-up signal is triggered following an event, and wherein the event corresponds to one of: receipt of a message for the first thread from another thread, arrival of a packet for the first thread, a timer expiration associated with the first thread, and establishment of a link for the first thread.

* * * * *